Oct. 22, 1968   D. J. PERSICHINI ET AL   3,406,561
GEAR TEETH CHECKING GAGE

Filed Feb. 1, 1966                              3 Sheets-Sheet 1

INVENTORS
DOMINIC J. PERSICHINI
REGINALD F. FREEMAN
BY Whittemore, Hulbert
   & Belknap

ATTORNEYS

Oct. 22, 1968  D. J. PERSICHINI ET AL  3,406,561
GEAR TEETH CHECKING GAGE
Filed Feb. 1, 1966  3 Sheets-Sheet 3

INVENTOR.S
DOMINIC J. PERSICHINI
REGINALD F. FREEMAN
BY
ATTORNEYS

United States Patent Office 3,406,561
Patented Oct. 22, 1968

3,406,561
GEAR TEETH CHECKING GAGE
Dominic J. Persichini, Garden City, and Reginald F. Freeman, Warren, Mich., assignors to Air Gage Company, Southfield, Mich., a corporation of Michigan
Filed Feb. 1, 1966, Ser. No. 524,277
1 Claim. (Cl. 73—1)

ABSTRACT OF THE DISCLOSURE

An air operated gage for checking gear parameters, such as tooth crown and lead is disclosed. In accordance with the invention separate cantilevered sensing fingers are movable into and out of contact with a member, such as a gear tooth to be checked, whereby the sensing fingers are displaced an amount depending on the parameter checked. The cantilevered sensing fingers regulate air orifices connected to air gages to separately indicate the deflection of the separate cantilevered fingers. The cantilevered sensing fingers may be mounted on a rotatable head, whereby gear teeth having selected leads may be readily checked.

---

It is therefore an object of the invention to provide improved air gage structure.

Another object is to provide air gage structure for gaging gear parameters in a manner not shown before.

Another object is to provide air gage structure as set forth above wherein the gear parameter is tooth crown.

Another object is to provide air gage structure as set forth above wherein the gear parameter is tooth lead.

Another object is to provide air gage structure including a slide, means mounted on the slide for receiving a gear in a fixed position relative thereto for movement therewith and pneumatic sensing means positioned adjacent the slide for gaging parameters of a gear.

Another object is to provide air gage structure as set forth above wherein the gear receiving means includes locating structure thereon for accurately locating a gear received thereby.

Another object is to provide air gage structure as set forth above and further including means for rotating the pneumatic sensing means for gaging gears having different tooth lead.

Another object is to provide air gage structure as set forth above and further including means for calibrating the pneumatic sensing means.

Another object is to provide air gage structure for gaging parameters of gears or the like which is simple in construction, economical to manufacture and efficient in use.

Other objects and features of the invention will become apparent as the description proceeds, especially when taken in conjunction with the accompanying drawings, illustrating a preferred embodiment of the invention, wherein.

With particular reference to the figures of the drawings, one embodiment of the present invention will now be considered in detail.

Figure 1:
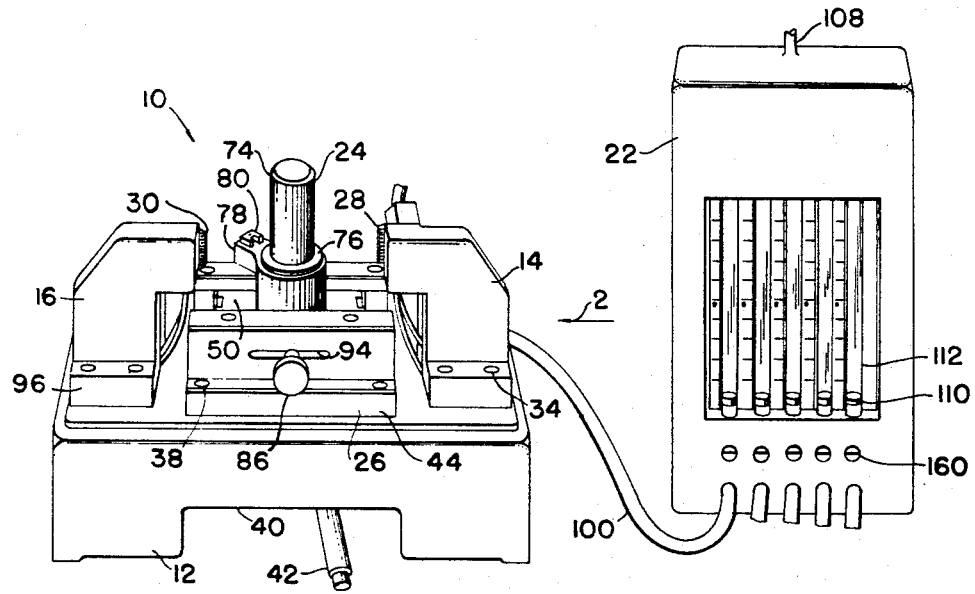
FIGURE 1 is a perspective view of air gage structure connected to a single, five column pneumatic instrument which gage structure is constructed in accordance with the invention.

The air gage structure 10 illustrated in FIGURE 1 includes the base 12, the gage heads 14 and 16 to which the pneumatic sensing means 28 and 30 are secured positioned at each end of the base 12. An expanding mandrel 24 is carried by slide structure 26 positioned centrally of the base 12. A gear 20, the parameters of which are to be checked, is secured to the mandrel 24 for movement between the gage heads 14 and 16 with slide structure 26. Pneumatic instruments 22 and 32 complete the air gage structure 10.

In operation a gear 20 is secured to the expanding mandrel 24 and moved between the gage heads 14 and 16 with the slide structure 26 to engage opposite sides of teeth on opposite sides of the gear 20 with the pneumatic sensing means 28 and 30. On engagement of the gear 20 with the sensing means 28 or 30, the deviation of the crown and lead of the gear tooth engaged with the sensing means from a desired crown and lead will be indicated on the instrument 22 or instrument 32 connected to the sensing means 28 and 30.

Figure 2:
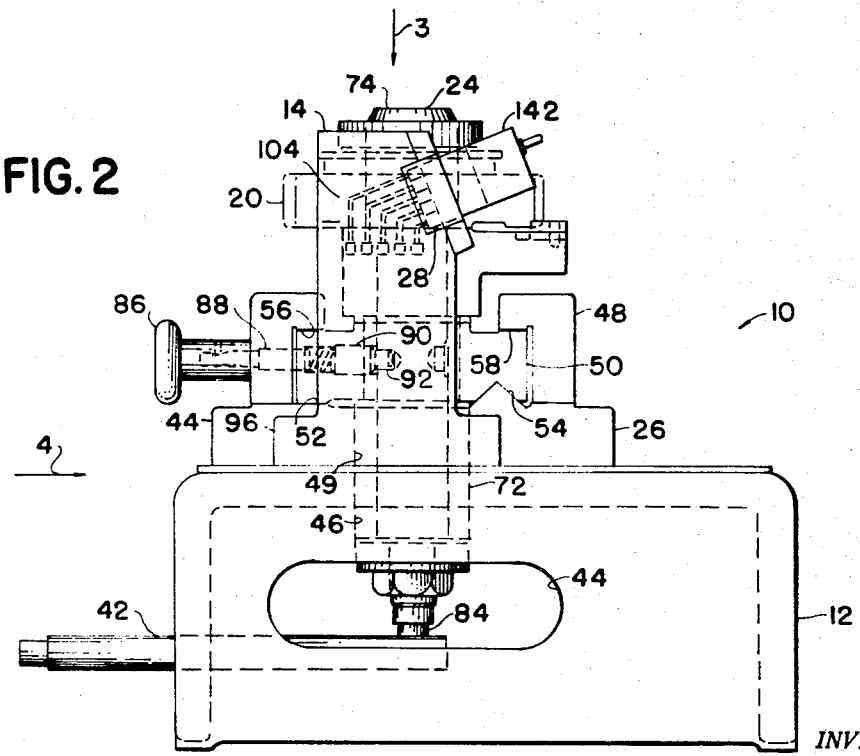
FIGURE 2 is an enlarged end view of the air gage structure illustrated in FIGURE 1 taken in the direction of arrow 2 in FIGURE 1.
Figure 3:
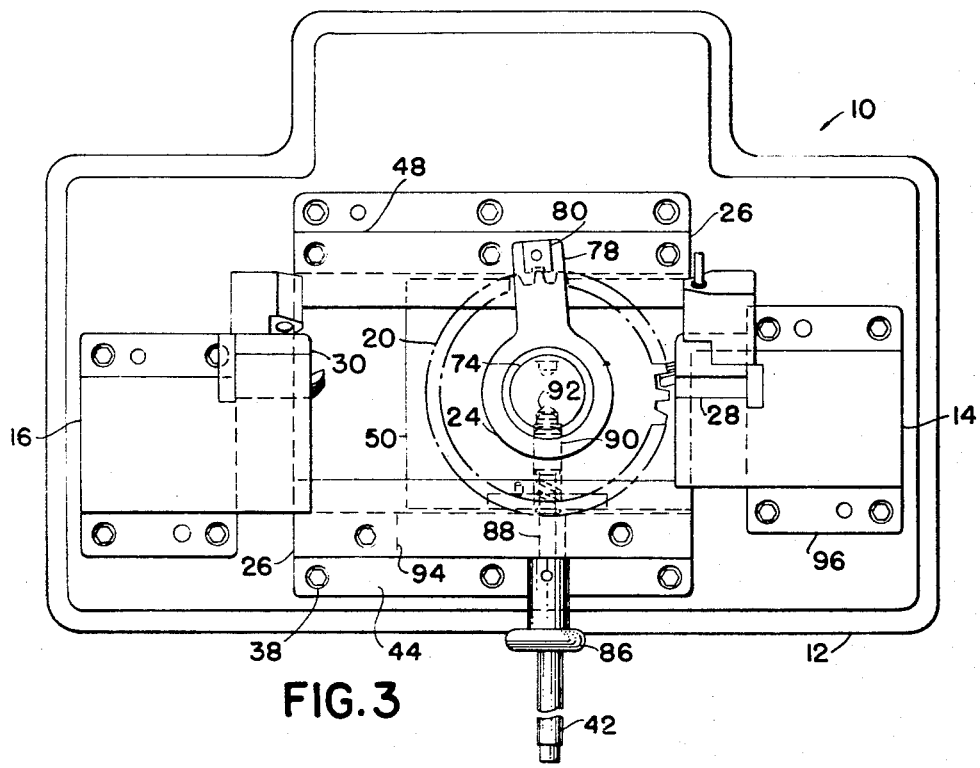
FIGURE 3 is a top view of the air gage structure illustrated in FIGURE 2 taken in the direction of arrow 3 in FIGURE 2.
Figure 4:
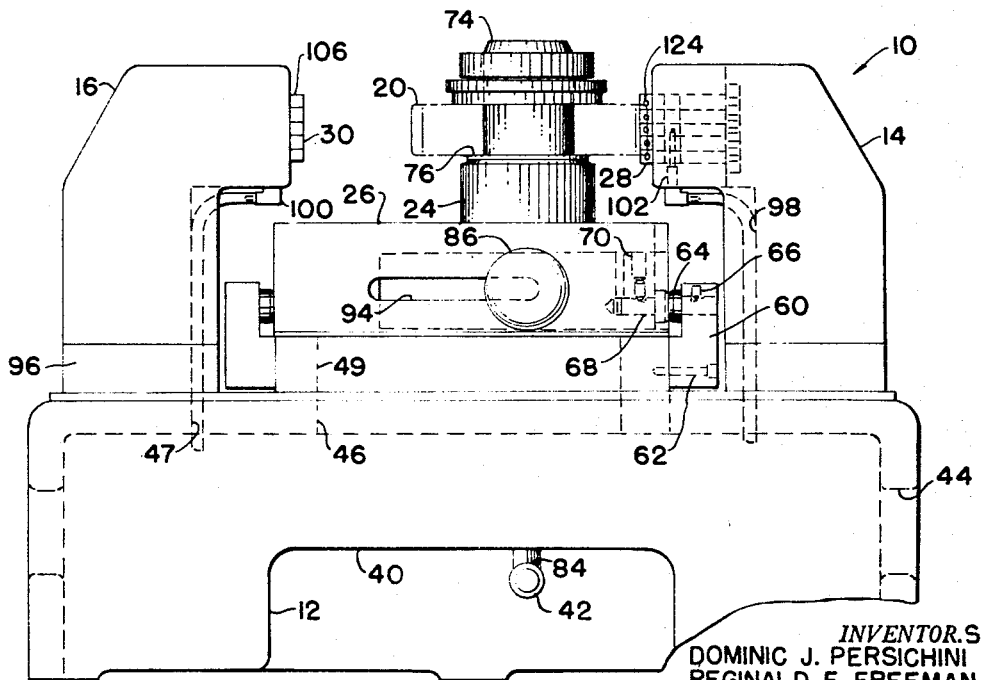
FIGURE 4 is a front view of the air gage structure illustrated in FIGURE 2 taken in the direction of arrow 4 in FIGURE 2.

More specifically, the base 12 may be a cast metal base. The base 12 is shaped as shown best in FIGURES 2-4 and includes the recess 40 therein through which the ratchet 42 for actuating the expanding mandrel 24 extends. Hand holes 44 are provided at the opposite ends of the base for convenience in moving the gage 10 and an elongated longitudinally extending opening 46 is provided in the base 12 to allow longitudinal movement of the expanding mandrel 24 with the slide 26. Openings 47 in the top of the base 12 at each end thereof provide access to the gage heads 14 and 16 for the pneumatic conduits 100.

The slide structure 26 includes the ways 44 having a central slot 49 therein aligned with slot 46 in base 12 along which the expanding mandrel 24 moves longitudinally of the base 12 which ways 44 is secured to the base 12 by convenient means, such as bolts 38. The slide structure 26 further includes the hold down members 48 secured to the ways 44 on each side thereof and the slide member 50 through which the expanding mandrel 24 extends and to which the expanding mandrel is rigidly secured. The ways 44 are provided with a bearing surface 52 at one side thereof and a triangular abutment 54 forming bearing surfaces on the other side thereof, while the slide 50 is provided with surfaces mating with the bearing surface 52 and abutment 54 of the ways and with surfaces mating with the bearing surfaces 56 and 58 of the hold down members 48. The slide member 50 is thus constrained to move in an accurately located direction which does not tend to vary even though wear is produced between the slide member and the ways.

At the ends of the slide 26 there are provided stop blocks 60 secured to the ways 44 by convenient means, such as bolts 62 having rest buttons 64 secured thereto by set screws 66. A similar rest button 68 is provided in each end of the slide member 50 secured therein by set screws 70. Thus, the longitudinal movement of the slide member 50 in the slide structure 26 is limited to prevent damage to the pneumatic sensing means 28 and 30.

The expanding mandrel 24 is commercially obtainable and will not therefore be considered in detail herein. The expanding mandrel 24 passes through the slot 46 in base 12 and slot 49 in ways 44 within bushing 72 and is secured to the slide member 50 for movement therewith. The expanding mandrel 24 has the reduced diameter end portion 74 over which a gear 20 to be checked is positioned in engagement with the annular abutment 76.

Locator structure 78 including a gear tooth engaging tab 80 is secured to the expanding mandrel 24 to hold the gear 20 in a predetermined position with respect to the mandrel 24. Thus with a gear positioned over the reduced diameter end portion 74 of the mandrel 24 having a tooth engaged with the tab 80, the gear will be held in a predetermined position so that teeth thereof will be in alignment with the pneumatic sensing means 28 and 30 at opposite sides of the air gage 10. The opposite sides of opposite teeth of the gear 20 may therefore be checked on movement of the slide member 20 toward opposite ends of the gage structure 10 to place the gear 20 in engagement with the sensing means 28 and 30 as will be seen subsequently.

The expanding mandrel 24 is caused to expand to grip a gear 20 positioned thereon by means of the ratchet 42 connected to the expanding mandrel 24 through the shaft 84. Thus, the ratchet 42 may be moved in opposite directions within the recess 40 in the base 12 to secure a gear 20 to the expanding mandrel 24 or release the gear 20 from the mandrel 24.

The slide member 50 with the expanding mandrel attached thereto is moved longitudinally of the air gage 10 between the rest buttons 64 by means of the knob 86 which is connected to the slide member 50 through spring biased shaft 88 urging the pin 90 into the recess 92 in the mandrel 24. The knob 86 slides along the slot 94 in the hold down members 48.

The gage heads 14 and 16 are provided with flange portions 96 which are secured to the base 12 by the bolts 34. Recesses 98 are provided in the heads 14 and 16 over the openings 47 in base 12 to permit the air lines 100 to pass therethrough and connect to the air fittings 102 in the head structures 14 and 16. Separate air lines 100, fittings 102 and air passages 104 are provided for each of the fingers 106 of the pneumatic sensing means 28 and 30. Thus, each of the fingers 106 are connected through the air lines 100 to a separate portion of the instruments 22 or 32.

The instruments 22 and 32 are purchased items, the details of which form no part of the present invention. However, it will be understood that air at a predetermined pressure is passed into the instruments through air lines 108 and out of the instruments through the separate air lines 100. The movable floats 110 in the calibrated, transparent indicator tubes 112 are then positioned in the tubes in accordance with the amount of air escaping from the separate air lines 100.

Figure 6:
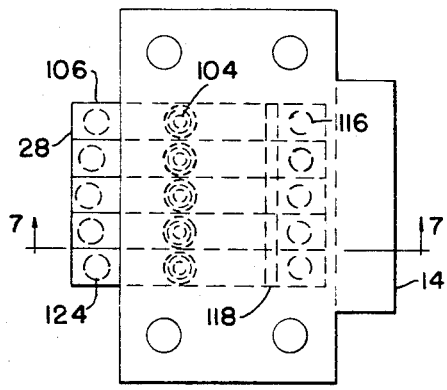
FIGURE 6 is an enlarged plan view of the pneumatic sensing means of the air gage illustrated in FIGURE 1.
Figure 5:
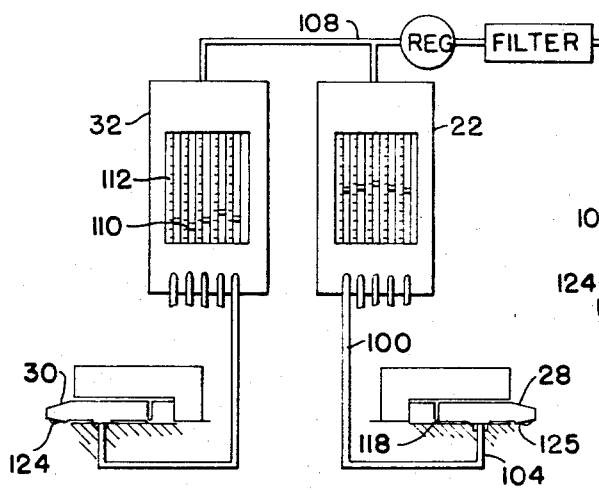
FIGURE 5 is a schematic diagram of the pneumatic circuit of the air gage illustrated in FIGURE 1 including two, five column pneumatic instruments.
Figure 7:
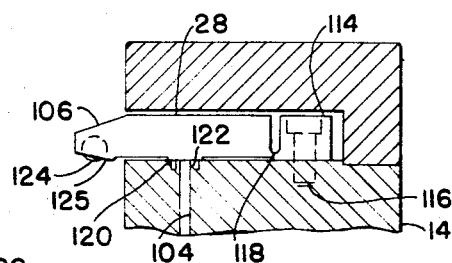
FIGURE 7 is a cross section view of the pneumatic sensing means illustrated in FIGURE 6 taken substantially on the line 7—7 in FIGURE 6.

The pneumatic sensing means 28 and 30, as shown best in FIGURES 6 and 7, each include five separate fingers 106 which are connected to a solid base portion 114 by means of bolts 116. The separate fingers 106 are connected to the base portion 114 by a very narrow pivot portion 118 so that the fingers 106 are cantilevered from the base 114 for pivotal movement about the pivot portion 118. Fingers 106 are further provided with a metering land 120 and the heads 14 and 16 are tripaned to provide an annular metering surface 122 about the ends of the air passages 104. In addition bearings 124 are positioned in the fingers 106 in an arcuate configuration on the inclined end surfaces 125 which is the same as the arcuate configuration of the crown on the tooth of a gear to be checked, as shown best in FIGURE 6.

Thus, when a gear tooth engages the bearings 124 with the slide member 50 in engagement with a stop button 64, if the crown and lead are correct, the fingers 106 will vary from the position indicated in FIGURE 7 so that the air escaping from the air passages 104 will hold the floats 110 in a zero error or central position to indicate the correct crown and lead on the gear tooth. An improper crown or lead on a gear tooth will cause the fingers 106 to pivot more or less about the portion 118 thereof to move the floats 110 up or down from the zero indication on the instrument 22 due to the escape of more or less air past the metering land 120 on the fingers 106.

The pneumatic sensing means 28 and 30 as shown are positioned angularly with respect to the vertical axis of the gage heads 14 and 16 to provide a proper check for gear tooth lead when a gear tooth is brought into contact with the sensing structure 28 or 30. Since the slope of the gear teeth will be in opposite directions on opposite sides of the gear, the sensing structures 28 and 30 are angled in opposite directions from the vertical on the gage heads 14 and 16.

Figure 9:
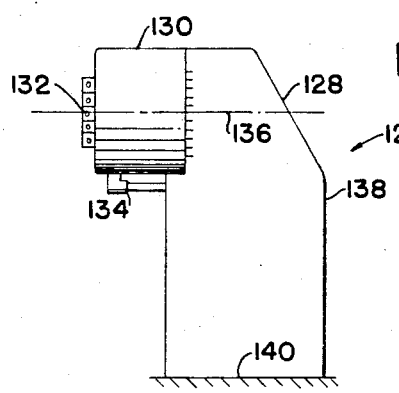
FIGURE 9 is an enlarged partial elevation view of modified air gage structure similar to that illustrated in FIGURE 1 and including rotatable pneumatic sensing means.

In the modified gage structure 126 illustrated in FIGURE 9 gage heads 128 are provided with portions 130 carrying pneumatic sensing means 132 and connected to air conduits 134 which portions 130 are rotatable about a horizontal axis 136. The pneumatic sensing means 132 may thus be set at a selected angle with respect to the portion 138 of the gage heads 128 which are rigidly secured to the base 140 of the gage structure 126. Gears having different tooth lead may thus be checked by the gage structure 126 by merely rotating the portions 130 of the gage heads 128 to provide the desired tooth lead angle for the pneumatic sensing means 132. In all other respects the modified gage structure 126 will be the same as gage structure 10.

Before operation of a gage structure 10 it is necessary to calibrate the pneumatic sensing means 28 and 30. To this end calibrating structure 144 is provided for use in conjunction with the pneumatic sensing means 28 and 30, as shown best in FIGURES 2 and 8.

Figure 8:
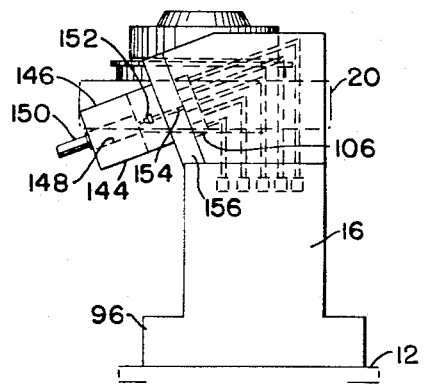
FIGURE 8 is an enlarged elevation view of a portion of the air gage structure illustrated in FIGURE 1 showing calibrating structure for the pneumatic sensing means in conjunction therewith.

As shown in FIGURE 8 the calibrating structure 144 includes a body member 146 having an air passage 148 therein connected to one column of an instrument, such as the instruments 22 and 32 by the air conduit 150. The calibrating structure 144 further includes the valve member 152 which extends out of the body member 146 and through an opening 154 associated with one of the fingers 106 in cover 156 for the pneumatic sensing means 30.

In operation, the calibrating structure 144 separately calibrates each of the fingers 106. Thus, with the fingers 106 in a fully closed position, that is with the metering land 120 in engagement with the metering surface 122, the valve structure 152 is positioned so that with the body member 146 firmly seated on the cover 156, the valve in contact with a particular finger 106 through one of the openings 154 will register no reading on the indicator to which it is attached. A master gear having correct tooth crown and lead is then positioned on the gage 10 and the expanding mandrel is moved so that a tooth of the gear is placed in engagement with the pneumatic sensing means 30. The fingers 106 are thus cantilevered a predetermined amount to produce a specific reading on the instrument to which the air conduit 150 is connected. Providing the gage has the proper calibration with the master gear in engagement with the pneumatic sensing structure 30, the instrument connected to the air conduit 150 will read a zero indication, that is the floats similar to floats 110 will be in the center of the glass tubes in which they move indicating no positive or negative deviation of the master gear tooth crown and lead from the desired gear parameters. If the calibration of the instrument 32 to which the particular finger 106 is secured is not the same as that of the calibrating instrument, the calibration of the instrument 32 can be changed by the calibrating screws 160 associated therewith.

It is of course not necessary to calibrate the gage structure 10 for every gear checked. In use it will be found that gage calibration at the beginning of each shift will probably be sufficient for required accuracies.

In overall operation, after the pneumatic sensing means 28 and 30 have been calibrated, a gear 20, the parameters of tooth crown and tooth lead of which are to be checked, is positioned over the reduced diameter end 74 of the expanding mandrel 24 and seated against the annular abutment 76. One tooth of the gear is positioned in the tab 80 of the gear positioning structure 78. The ratchet 42 is moved in the recess 40 to clamp the gear in the predetermined fixed position. The expanding mandrel 24 is then moved longitudinally of the gage 10 with the slide member 50 by means of the knob 86 moving in the slot 94 until the gear 20 engages one of the pneumatic sensing means 28 and 30 and the slide member rests against the associated stop button.

At this time the fingers 106 of the pneumatic sensing means engaged will be cantilevered to a position determined by the gear tooth crown and lead and air will be permitted to escape through air conduits 100 and air passage 104 to position the floats 110 in the instrument 22 or 32 associated with the pneumatic sensing means 28 or 30 engaged by the gear being checked in accordance with the deviation of the crown and lead of the engaged tooth from a desired crown and lead. The floats 110 will thus be positioned up or down in the tubes 112 of the instrument to register deviation from the desired gear parameters.

On movement of the expanding mandrel 24 in the opposite direction into engagement with the other pneumatic sensing structure, the other side of a gear tooth positioned opposite the first gear tooth checked may be checked as to crown and lead. The ratchet 24 is then moved in the slot 40 to open the expanding mandrel 24 and the gear is released from the expanding mandrel 24.

The gear is then indexed one tooth in the tab 80 and the entire checking process is repeated. These checking cycles are continued until all sides of all teeth of the gear have been checked.

While one embodiment and modifications of the pneumatic gage structure of the invention have been considered in detail, it will be understood that other embodiments and modifications of the gage structure are contemplated. It is the intention to include all embodiments and modifications as are defined by the appended claims within the scope of the invention.

What we claim as our invention is:

1. Gage structure including means for holding a gear to be checked and pneumatic means positioned adjacent and operably associated with the gear holding means for sensing at least one parameter of a gear positioned on the gear holding means on engagement of the gear with the pneumatic means, including a gage head, a plurality of separate fingers secured to and cantilevered from the gage head engageable with a tooth of the gear to be checked on movement of the gear towards the gage head and a pneumatic instrument operably associated with the fingers for indicating movement thereof, said gage head being provided with a rotatable gage head portion for varying the angular relation of the fingers and the teeth of a gear positioned on the gear holding means whereby selected tooth leads may be checked.

References Cited

UNITED STATES PATENTS

| 1,580,081 | 4/1926  | Wickman | 33—179.5 |
| 2,952,918 | 9/1960  | Eichman | 33—167   |
| 3,167,867 | 2/1965  | Reef    | 33—179.5 |
| 3,224,105 | 12/1965 | Ely     | 33—179.5 |

FOREIGN PATENTS 577,294   5/1946   Great Britain.

DAVID SCHONBERG, *Primary Examiner.*

S. CLEMENT SWISHER, *Assistant Examiner.*